United States Patent
Okada et al.

(10) Patent No.: US 9,153,386 B2
(45) Date of Patent: Oct. 6, 2015

(54) ELECTRIC STORAGE DEVICE PRESSURE REGULATING APPARATUS AND ELECTRIC STORAGE DEVICE

(75) Inventors: Tatsunori Okada, Tokyo (JP); Kenro Mitsuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 356 days.

(21) Appl. No.: 13/880,517

(22) PCT Filed: Nov. 10, 2011

(86) PCT No.: PCT/JP2011/075945
§ 371 (c)(1),
(2), (4) Date: Apr. 19, 2013

(87) PCT Pub. No.: WO2012/070397
PCT Pub. Date: May 31, 2012

(65) Prior Publication Data
US 2013/0208405 A1    Aug. 15, 2013

(30) Foreign Application Priority Data
Nov. 22, 2010    (JP) .................................. 2010-260064

(51) Int. Cl.
*H01G 9/12* (2006.01)
*H01M 2/12* (2006.01)
(Continued)

(52) U.S. Cl.
CPC ................. *H01G 9/12* (2013.01); *H01G 11/14* (2013.01); *H01M 2/1211* (2013.01); *H01M 2/1247* (2013.01); *H01M 2/1264* (2013.01); *H01M 2/345* (2013.01); *Y02E 60/13* (2013.01)

(58) Field of Classification Search
CPC ....................................................... H01G 9/12

USPC .............................................. 361/521; 429/53
See application file for complete search history.

(56) References Cited

U.S. PATENT DOCUMENTS 2,227,319 A * 12/1940 Pontis et al. ............. 220/203.29
3,013,190 A * 12/1961 Nieders .......................... 361/521
(Continued)

FOREIGN PATENT DOCUMENTS

JP      57 143261       9/1982
JP      60 30048        2/1985
(Continued)

OTHER PUBLICATIONS

International Search Report Issued Feb. 14, 2012 in PCT/JP11/75945 Filed Nov. 10, 2011.
(Continued)

*Primary Examiner* — Eric Thomas
(74) *Attorney, Agent, or Firm* — Oblon, McClelland, Maier & Neustadt, L.L.P.

(57) ABSTRACT

An electric storage device pressure regulating apparatus includes: a case in an internal portion of which is disposed a regulating chamber that communicates with a space in a vessel by an opening portion; a semipermeable membrane that seals the opening portion; a check valve that stops discharging of the gas out of the vessel from inside the regulating chamber when the internal pressure of the regulating chamber is less than or equal to a predetermined value, and that discharges the gas out of the vessel from inside the regulating chamber when the internal pressure of the regulating chamber exceeds the value; and a communicating pipe that communicates between a space inside the regulating chamber and a space inside the vessel and extends from the case to an electric storage device main body.

9 Claims, 4 Drawing Sheets

(51) Int. Cl.
  *H01G 11/14* (2013.01)
  *H01M 2/34* (2006.01)

(56) References Cited

U.S. PATENT DOCUMENTS

| | | | |
|---|---|---|---|
| 4,348,466 | A | 9/1982 | Elehew et al. |
| 4,613,550 | A | 9/1986 | Jergl et al. |
| 2002/0190428 | A1* | 12/2002 | Tamura et al. ............. 264/259 |
| 2010/0178552 | A1 | 7/2010 | Kim et al. |
| 2012/0015218 | A1* | 1/2012 | Lee ............................. 429/53 |
| 2012/0015219 | A1* | 1/2012 | Wang et al. ................. 429/53 |
| 2012/0176730 | A1 | 7/2012 | Takemura et al. |

FOREIGN PATENT DOCUMENTS

| | | |
|---|---|---|
| JP | 60 39763 | 3/1985 |
| JP | 62 52854 | 3/1987 |
| JP | 8 22815 | 1/1996 |
| JP | 2000 335649 | 12/2000 |
| JP | 2006 125559 | 5/2006 |
| JP | 2006 269704 | 10/2006 |
| JP | 2010 506356 | 2/2010 |

OTHER PUBLICATIONS

U.S. Appl. No. 13/344,103, filed Jan. 5, 2012, Takemura, et al.

\* cited by examiner

ELECTRIC STORAGE DEVICE PRESSURE REGULATING APPARATUS AND ELECTRIC STORAGE DEVICE

TECHNICAL FIELD

The present invention relates to an electric storage device pressure regulating apparatus that adjusts internal pressure of an electric storage device, and to an electric storage device that has an electric storage device pressure regulating apparatus.

BACKGROUND ART

Conventionally, capacitors are known that have: a capacitor main body that is impregnated with an electrolytic solution; and a vessel that seals the capacitor main body. In capacitors of this kind, if gas is generated by the capacitor main body by charging and discharging the capacitor main body repeatedly, then there is a risk that internal pressure in the vessel gradually may rise, damaging the vessel.

Conventionally, in order to adjust the internal pressure of the vessel, capacitor pressure regulating apparatuses have been proposed that have: a gas venting valve that releases gas that is inside the vessel out of the vessel if the pressure inside the vessel exceeds a predetermined pressure, while preventing entry of external gas into the vessel; and a semipermeable film that is a porous membrane that covers the gas venting valve from inside the vessel, and that stops penetration of an electrolytic solution that is inside the vessel, while allowing the gas that is inside the vessel to permeate (see Patent Literature 1 and 2, for example).

CITATION LIST

Patent Literature

[Patent Literature 1]
 Japanese Patent No. 3884039 (Gazette)
[Patent Literature 2]
 Japanese Patent No. 3992517 (Gazette)

SUMMARY OF THE INVENTION

Problem to be Solved by the Invention

However, in the capacitor pressure regulating apparatuses that are disclosed in Patent Literature 1 and 2, if the capacitor falls over, or the vessel is deformed by external forces, and the semipermeable film is covered by the electrolytic solution, for example, then the gas that is inside the vessel may not permeate the semipermeable film, and there is a risk that the internal pressure of the vessel may rise abnormally.

Similarly, the electrolytic solution is more likely to penetrate the semipermeable film if a constant differential pressure arises at the front and rear of the semipermeable film. Consequently, if the semipermeable film is covered by the electrolytic solution, then the electrolytic solution that is inside the vessel may penetrate the semipermeable film, and the electrolytic solution may leak out of the vessel through the gas venting valve together with the gas. Thus, not only is the amount of electrolytic solution that is inside the vessel reduced and service life shortened, but there is also a risk that problems may arise in the operation of the gas venting valve due to the electrolytic solution crystallizing on the gas venting valve.

The present invention aims to solve the above problems and an object of the present invention is to provide an electric storage device pressure regulating apparatus and an electric storage device that enable improvements in operational reliability and that also enable extension of service life of the electric storage device.

Means for Solving the Problem

In order to achieve the above object, according to one aspect of the present invention, there is provided an electric storage device pressure regulating apparatus that is disposed on an electric storage device that includes: an electric storage device main body that is impregnated with an electrolytic solution; and a vessel that hermetically seals the electric storage device main body, the electric storage device pressure regulating apparatus regulating internal pressure of the vessel, the electric storage device pressure regulating apparatus including: a case that is disposed inside the vessel so as to cover an gas vent that is disposed on the vessel, and on which a regulating chamber is disposed internally on which an opening portion is disposed, the regulating chamber communicating with a space inside the vessel by means of the opening portion; a porous semipermeable membrane that seals the opening portion, and through which a gas that is inside the vessel can permeate; a check valve that stops discharging of the gas out of the vessel from inside the regulating chamber when internal pressure of the regulating chamber is less than or equal to a predetermined value, and that discharges gas out of the vessel from inside the regulating chamber through the gas vent when the internal pressure of the regulating chamber exceeds the predetermined value; and an electrolytic solution returning portion that communicates between a space inside the regulating chamber and a space inside the vessel, that includes a porous electrolytic solution holding body that contacts the case and the electric storage device main body, that extends from the case to the electric storage device main body, and that directs electrolytic solution that enters the regulating chamber to the electric storage device main body.

Effects of the Invention

In an electric storage device pressure regulating apparatus according to the present invention, because a regulating chamber is disposed inside a case, and an electrolytic solution returning portion that mutually communicates between a space inside the regulating chamber and a space inside a vessel extends from the case to an electric storage device main body, even if electrolytic solution penetrates the semipermeable membrane, the electrolytic solution can be prevented from reaching a check valve by accumulating the electrolytic solution that is inside the regulating chamber. The electrolytic solution can thereby be prevented from crystallizing on the check valve, enabling improvements in operational reliability of the electric storage device pressure regulating apparatus to be achieved. Electrolytic solution that has penetrated the semipermeable membrane and entered the regulating chamber can be returned to the vessel through the electrolytic solution returning portion. Reduction of electrolytic solution that is inside the vessel can thereby be suppressed, enabling service life of the electric storage device to be extended.

DESCRIPTION OF EMBODIMENTS

Embodiment 1

Figure 1:
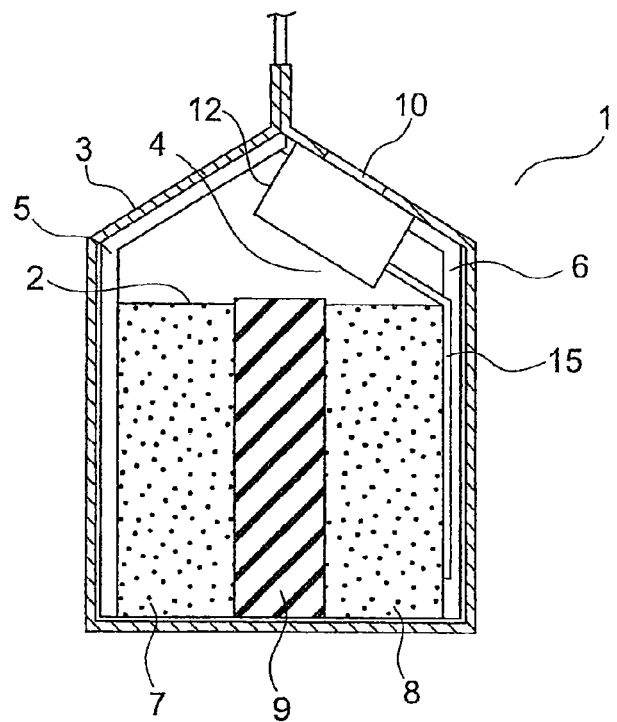
FIG. 1 is a cross section that shows an electric storage device according to Embodiment 1 of the present invention.

FIG. 1 is a cross section that shows an electric storage device according to Embodiment 1 of the present invention. In the figure, an electric storage device 1 has: an electric storage device main body 2 in which charging and discharging are performed; a vessel 3 that hermetically seals the electric storage device main body 2; and a pressure regulating apparatus (an electric storage device pressure regulating apparatus) 4 that is disposed on the vessel 3, and that adjusts internal pressure of the vessel 3.

The electric storage device main body 2 is disposed inside the vessel 3 such that a space is formed in an upper portion inside the vessel 3. A positive electrode power collection terminal 5 and a negative electrode power collection terminal 6 that are made of metal (aluminum or copper, etc.) for performing electrical connection between the electric storage device main body 2 and external equipment are disposed on the electric storage device main body 2. The positive electrode power collection terminal 5 and the negative electrode power collection terminal 6 are exposed outside the vessel 3 through an upper end portion of the vessel 3.

The electric storage device main body 2 has: a positive electrode 7 to which the positive power collection terminal 5 is connected; a negative electrode 8 to which the negative power collection terminal 6 is connected; and a separator 9 that is positioned between the positive electrode 7 and the negative electrode 8.

The positive electrode 7 and the negative electrode 8 each function as porous electrodes in which a plurality of microvoids are disposed. An electrode that contains carbon, or an electrode that contains lithium and cobalt, for example, can be used as the positive electrode 7. An electrode that contains carbon, for example can be used as the negative electrode 8.

The separator 9 functions as a porous membrane on which a plurality of microvoids are disposed. Paper or polypropylene, for example, can be used as the separator 9.

An electrolytic solution is impregnated into the electric storage device main body 2 (i.e., into the positive electrode 7, the negative electrode 8, and the separator 9). An electrolytic solution that contains propylene carbonate, for example, can be used as the electrolytic solution. Charging and discharging of the electric storage device main body 2 is performed by the ions or electrons in the electrolytic solution moving between the positive electrode 7 and the negative electrode 8. When charging and discharging of the electric storage device main body 2 is performed, a gas such as $H_2$, or CO, or $CO_2$, for example, is generated by the electric storage device main body 2. The internal pressure of the vessel 3 rises due to the generation of the gas by the electric storage device main body 2.

The vessel 3 is a hermetically sealed vessel that prevents transmission of liquids and gases. In this example, the vessel 3 is a deformable bag that is formed using an aluminum laminated sheet. An gas vent 10 is disposed on an upper portion of the vessel 3.

The pressure regulating apparatus 4 is mounted onto an inner surface of the vessel 3 so as to cover the gas vent 10 from inside the vessel 3. The pressure regulating apparatus 4 regulates the internal pressure of the vessel 3 while preventing electrolytic solution that is inside the vessel 3 from leaking out of the vessel 3 through the gas vent 10.

Figure 2:
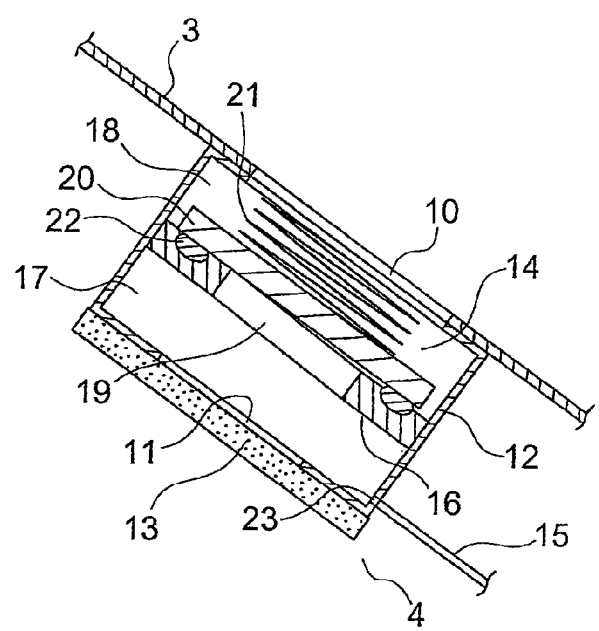
FIG. 2 is a cross section that shows a pressure regulating apparatus from FIG. 1.

FIG. 2 is a cross section that shows the pressure regulating apparatus 4 from FIG. 1. In the figure, the pressure regulating apparatus 4 has: a case 12 on which an opening portion 11 is disposed; a semipermeable membrane 13 that seals the opening portion 11, and that can transmit the gas that is inside the vessel 3; a check valve 14 that is disposed inside the case 12, and that prevents entry of external gas into the vessel 3; and a communicating pipe (an electrolytic solution returning portion) 15 that is connected to the case 12, and that communicates between a space inside the case 12 and a space inside the vessel 3.

The case 12 is fixed by welding to the inner surface of the vessel 3 so as to cover the gas vent 10. The case 12 is disposed so as to be separated from the electric storage device main body 2, as shown in FIG. 1. In addition, a regulating chamber 17 and a check valve chamber 18 that are partitioned by a partitioning plate 16 are disposed inside the case 12. The regulating chamber 17 communicates with the space inside the vessel 3 by means of the opening portion 11. The check valve chamber 18 communicates with a space outside the vessel 3 by means of the gas vent 10. A valve opening and closing port 19 that communicates between the regulating chamber 17 and the check valve chamber 18 is disposed on the partitioning plate 16.

The semipermeable membrane 13 seals the opening portion 11 so as to be affixed to an outer surface of the case 12. The semipermeable membrane 13 is a porous membrane on which a plurality of microvoids are disposed. The semipermeable membrane 13 thereby transmits gas through the plurality of microvoids. Consequently, if the internal pressure of the vessel 3 rises due to gas that is generated by the electric storage device main body 2, then the gas that is inside the vessel 3 is transmitted through the semipermeable membrane 13 and enters the regulating chamber 17, and the internal pressure of the regulating chamber 17 rises in response to the internal pressure of the vessel 3. The semipermeable membrane 13 is constituted by polypropylene (PP), polyethylene (PE), or polytetrafluoroethylene (PTFE), for example.

The check valve 14 is disposed inside the check valve chamber 18. The check valve 14 stops entry of external gas into the regulating chamber 17. The check valve 14 stops the discharging of the gas out of the vessel 3 from inside the regulating chamber 17 if the internal pressure of the regulating chamber 17 is less than or equal to a predetermined value, and discharges the gas out of the vessel 3 from inside the regulating chamber 17 through the check valve chamber 18 and the gas vent 10 if the internal pressure of the regulating chamber 17 exceeds the predetermined value.

The check valve 14 has: a valve main body 20 that opens and closes the valve opening and closing port 19; and a forcing spring (a forcing body) 21 that forces the valve main body 20 in a direction that closes the valve opening and closing port 19.

The forcing spring 21 is compressed between an inner surface of the check valve chamber 18 and the valve main body 20 to generate an elastic repulsive force. The forcing spring 21 forces the valve main body 20 toward the partitioning plate 16 by applying the elastic repulsive force to the valve main body 20.

A resin packing (an O-ring) 22 that surrounds the valve opening and closing port 19 is disposed on a surface of the partitioning plate 16 near the check valve chamber 18. The valve main body 20 closes the valve opening and closing port 19 by being pressed against the partitioning plate 16 so as to have the packing 22 interposed while receiving the force from the forcing spring 21. The valve main body 20 opens the valve opening and closing port 19 by being displaced away from the packing 22 in opposition to the force from the forcing spring 21.

The valve main body 20 is pressed onto the partitioning plate 16 by the force from the forcing spring 21 to close the valve opening and closing port 19 when the internal pressure of the regulating chamber 17 is less than or equal to a predetermined value. If the internal pressure of the regulating chamber 17 exceeds the predetermined value, then the internal pressure of the regulating chamber 17 overcomes the force from the forcing spring 21, and the valve main body 20 is displaced in opposition to the force from the forcing spring 21, opening the valve opening and closing port 19. The gas that is inside the regulating chamber 17 is discharged out of the vessel 3 through the gas vent 10 by the valve opening and closing port 19 opening. The check valve 14 regulates the internal pressure of the regulating chamber 17 by performing the opening and closing operations of the valve opening and closing port 19 in response to the internal pressure of the regulating chamber 17.

In an electric storage device 1, it is conceivable that a situation may arise in which the front surface of the semipermeable membrane 13 is covered by the electrolytic solution due to the electric storage device 1 falling over or the vessel 3 deforming, for example. In a state in which only the front surface of the semipermeable membrane 13, and not the rear surface, is covered by the electrolytic solution, because the front surface of the semipermeable membrane 13 is blocked by the electrolytic solution, the transmission of gas by the semipermeable membrane 13 is obstructed by the electrolytic solution. In the state in which only the front surface of the semipermeable membrane 13, and not the rear surface, is covered by the electrolytic solution, the semipermeable membrane 13 stops penetration of the electrolytic solution (i.e., exhibits a gas-liquid separating function) when differential pressure between a front surface side and a rear surface side is less than or equal to a predetermined limiting value, but can no longer stop penetration of the electrolytic solution if the differential pressure exceeds the predetermined limiting value, and penetration of the electrolytic solution is then allowed. The pressure at which the electrolytic solution penetrates the semipermeable membrane 13 (i.e., the predetermined limiting value) is set so as to be lower than the pressure at which the vessel 3 breaks.

Figure 3:
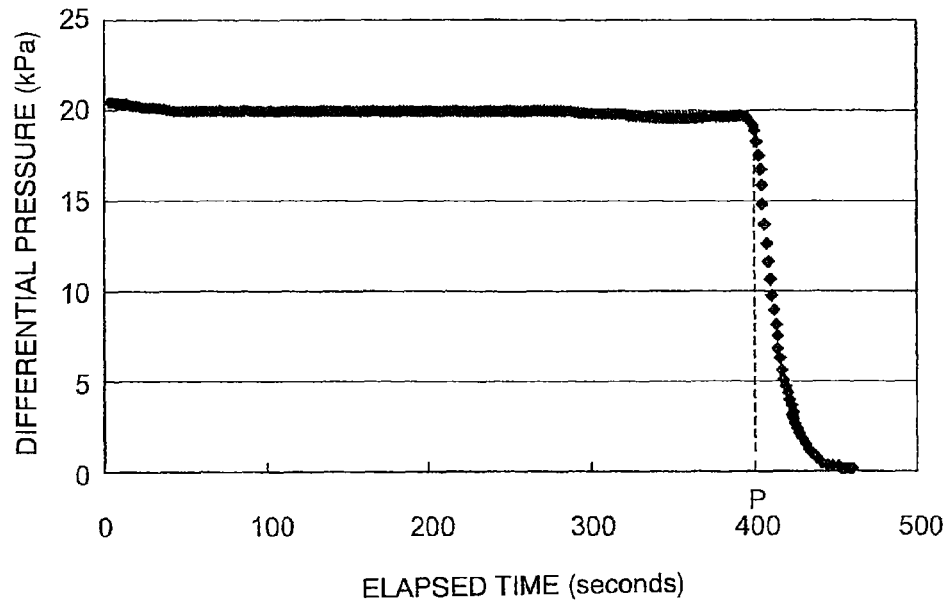
FIG. 3 is a graph that shows changes in differential pressure between a front surface side and a rear surface side of a semipermeable membrane from FIG. 2 when an electrolytic solution is removed from a state in which only the front surface of the semipermeable membrane, and not the rear surface, is covered by the electrolytic solution.

Now, FIG. 3 is a graph that shows changes in differential pressure between a front surface side and a rear surface side of a semipermeable membrane 13 from FIG. 2 when the electrolytic solution is removed from a state in which only the front surface of the semipermeable membrane 13, and not the rear surface, is covered by the electrolytic solution. As shown in FIG. 3, it can be seen that when the front surface of the semipermeable membrane 13 is covered by the electrolytic solution, the differential pressure between the front surface side and the rear surface side of the semipermeable membrane 13 remains at 20 kPa, and the transmission of gas by the semipermeable membrane 13 is stopped. When the electrolytic solution is removed at point P, it can be seen that the differential pressure between the front surface side and the rear surface side of the semipermeable membrane 13 is reduced sharply, and the gas is transmitted through the semipermeable membrane 13. From this it can be seen that the semipermeable membrane 13 exhibits the gas-liquid separating function when the differential pressure between the front surface side and the rear surface side of the semipermeable membrane 13 is 20 kPa.

In the pressure regulating apparatus 4, this means that in a state in which the front surface of the semipermeable membrane 13 is covered by the electrolytic solution, the electrolytic solution inside the vessel 3 penetrates the semipermeable membrane 13 and enters the regulating chamber 17 when the differential pressure between the front surface side (inside the vessel 3) and the rear surface side (inside the regulating chamber 17) of the semipermeable membrane 13 exceeds the predetermined limiting value.

As shown in FIG. 1, a communicating pipe 15 extends from the case 12 to the electric storage device main body 2. As shown in FIG. 2, a connecting port 23 that passes through a wall of the case 12 is disposed on a lower portion of the case 12. A first end portion of the communicating pipe 15 is connected to the case 12 so as to be aligned with the position of the connecting port 23. A second end portion of the communicating pipe 15 contacts the negative electrode 8 at a side surface of the electric storage device main body 2. The second end portion of the communicating pipe 15 opens into the vessel 3. The space inside the regulating chamber 17 and the space inside the vessel 3 thereby communicate with each other by means of the communicating pipe 15. The electrolytic solution that enters the regulating chamber 17 is led through the communicating pipe 15 to the electric storage device main body 2.

As shown in FIG. 1, the second end portion of the communicating pipe 15 reaches a vicinity of a bottom surface of the vessel 3. In this example, the second end portion of the communicating pipe 15 is separated from the bottom surface of the vessel 3 by a distance (10 mm, for example) that is approximately ten percent of the overall height dimension (100 mm, for example) of the vessel 3.

Polypropylene (PP), polyethylene (PE), or polytetrafluoroethylene (PTFE), for example, can be used as a material for the communicating pipe 15. It is particularly desirable to make the material of the communicating pipe 15 a material that has properties such that an angle of contact with the electrolytic solution is less than or equal to 90 degrees (i.e., a material that has high hydrophilicity (polypropylene, for example)). By using a material that has high hydrophilicity as the material of the communicating pipe 15, capillary action occurs, making it easier for the electrolytic solution to be led through the communicating pipe 15.

The volume of the regulating chamber 17 is a volume that can accommodate an amount of excess electrolytic solution that is obtained by subtracting the electrolytic solution that can be impregnated into the electric storage device main body 2 from a total amount of electrolytic solution that is inside the vessel 3. Thus, the electrolytic solution is prevented from overflowing from inside the regulating chamber 17 even if the excess electrolytic solution in the vessel 3 flows backward through the communicating pipe 15 from inside the vessel 3 into the regulating chamber 17.

Next, operation will be explained. In the electric storage device 1, gas is generated in the electric storage device main body 2 due to secondary reactions resulting from residual moisture and impurities occurring as charging and discharging of the electric storage device main body 2 is repeated, and the internal pressure of the vessel 3 gradually rises. The internal pressure of the regulating chamber 17 also gradually rises in response to the internal pressure of the vessel 3 due to the gas that is inside the vessel 3 being transmitted through the semipermeable membrane 13.

When the internal pressure of the regulating chamber 17 exceeds the predetermined value, the gas that is inside the regulating chamber 17 pushes the valve main body 20 upward in opposition to the force from the forcing spring 21, and is discharged out of the vessel 3 from the valve opening and closing port 19 through the gas vent 10. The internal pressure of the vessel 3 and the internal pressure of the regulating chamber 17 are thereby regulated.

If the front surface of the semipermeable membrane 13 is covered by the electrolytic solution that is inside the vessel 3 due to deformation of the vessel 3 or overturning of the electric storage device 1, for example, the gas does not permeate the semipermeable membrane 13 because the front surface of the semipermeable membrane 13 is sealed by the electrolytic solution. The internal pressure of the vessel 3 thereby becomes more difficult to regulate, and the internal pressure of the vessel 3 continues rising.

The electrolytic solution will not penetrate the semipermeable membrane 13 at a stage when the differential pressure between the front surface side (within the vessel 3) and the rear surface side (inside the regulating chamber 17) of the semipermeable membrane 13 is less than or equal to the predetermined limiting value.

If the internal pressure of the vessel 3 subsequently rises further, and the differential pressure between the front surface side and the rear surface side of the semipermeable membrane 13 exceeds the predetermined limiting value, the electrolytic solution that is inside the vessel 3 penetrates the semipermeable membrane 13, and enters the regulating chamber 17.

The electrolytic solution that enters the regulating chamber 17 accumulates temporarily inside the regulating chamber 17, and is returned into the vessel 3 by passing through the communicating pipe 15 and being led to the electric storage device main body 2. The electrolytic solution that is inside the vessel 3 is thereby prevented from leaking out of the vessel 3.

If the internal pressure of the vessel 3 becomes abnormally higher than the internal pressure of the regulating chamber 17, then it is also conceivable that the electrolytic solution that is inside the vessel 3 may flow backward through the communicating pipe 15 into the regulating chamber 17 together with the gas. However, because a volume sufficient to accommodate the excess electrolytic solution is ensured in the regulating chamber 17, the electrolytic solution that flows backward into the regulating chamber 17 is kept inside the regulating chamber 17, and only the gas is discharged out of the vessel 3 through the valve opening and closing port 19. The electrolytic solution that accumulates inside the regulating chamber 17 is returned to the vessel 3 through the communicating pipe 15 when the internal pressure of the vessel 3 drops.

In a pressure regulating apparatus 4 of this kind, because a regulating chamber 17 is disposed inside a case 12, and a communicating pipe 15 that mutually communicates between a space inside the regulating chamber 17 and a space inside a vessel 3 extends from the case 12 to an electric storage device main body 2, even if electrolytic solution penetrates a semipermeable membrane 13, the electrolytic solution can be prevented from reaching a check valve 14 by accumulating the electrolytic solution inside the regulating chamber 17. The electrolytic solution can thereby be prevented from crystallizing on the check valve 14, enabling improvements in operational reliability of the pressure regulating apparatus 4 to be achieved. Electrolytic solution that has penetrated the semipermeable membrane 13 and entered the regulating chamber 17 can be returned to the vessel 3 through the communicating pipe 15. Reduction of electrolytic solution that is inside the vessel 3 can thereby be suppressed, enabling service life of the electric storage device 1 to be extended.

Because the volume of the regulating chamber 17 is a volume that can accommodate the amount of excess electrolytic solution when the amount of electrolytic solution that can be impregnated into the electric storage device main body 2 is subtracted from the gross weight of the electrolytic solution that is inside the vessel 3, the electrolytic solution is prevented from overflowing from inside the regulating chamber 17 even if all of the excess electrolytic solution in the vessel 3 enters the regulating chamber 17. Thus, further improvements in operational reliability of the pressure regulating apparatus 4 are enabled.

Moreover, in the above example, a second end portion of the communicating pipe 15 contacts a negative electrode 8 at a side surface of the electric storage device main body 2, but the second end portion of the communicating pipe 15 need only contact any portion of the electric storage device main body 2, and the second end portion of the communicating pipe 15 may also contact the positive electrode 7 at a side surface of the electric storage device main body 2, or the second end portion of the communicating pipe 15 may also contact at least one of the positive electrode 7, the negative electrode 8, and the separator 9 at an upper surface of the electric storage device main body 2.

Embodiment 2

Figure 4:
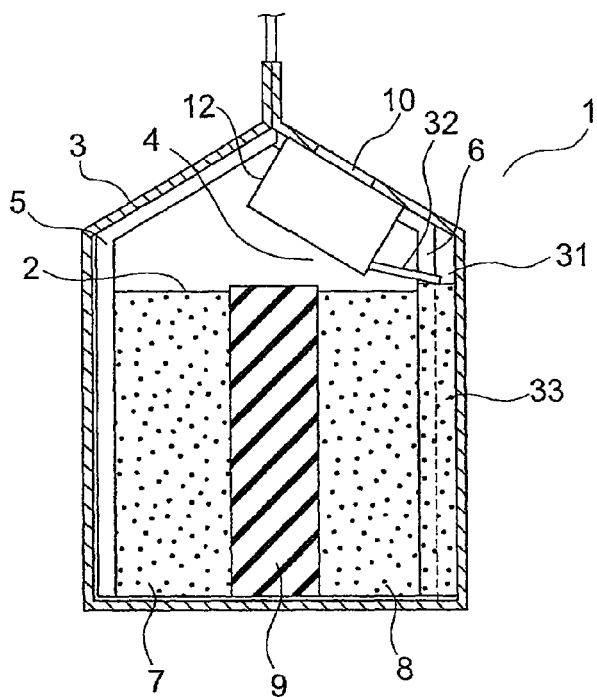
FIG. 4 is a cross section that shows an electric storage device according to Embodiment 2 of the present invention.

FIG. 4 is a cross section that shows an electric storage device according to Embodiment 2 of the present invention. In the figure, an electrolytic solution returning portion 31 that directs electrolytic solution that enters a regulating chamber 17 into a vessel 3 is disposed on a case 12. The electrolytic solution returning portion 31 mutually communicates between a space inside the regulating chamber 17 and a space inside the vessel 3. The electrolytic solution returning portion 31 has: a communicating pipe 32 that is connected to the case 12; and an electrolytic solution holding body 33 that is connected to the communicating pipe 32 and that contacts an electric storage device main body 2.

The communicating pipe 32 is connected to the case 12 so as to be aligned with a position of a connecting port 23 (FIG. 2). A material of the communicating pipe 32 is similar or identical to the material of the communicating pipe 15 according to Embodiment 1.

The electrolytic solution holding body 33 is a porous member (a foam body) in which a plurality of microvoids are disposed. The electrolytic solution is impregnated into the electrolytic solution holding body 33. In this example, the electrolytic solution holding body 33 contacts the negative electrode 8 at a side surface of the electric storage device main body 2. An average void diameter (a pore size) of the microvoids that are disposed in the electrolytic solution holding body 33 is greater than average void diameters (pore sizes) of the microvoids that are disposed in the positive electrode 7 and the negative electrode 8, respectively. Polypropylene (PP), polyethylene (PE), or polytetrafluoroethylene (PTFE), for example, can be used as a material for the electrolytic solution holding body 33.

The electrolytic solution that enters the regulating chamber 17 is led to the electrolytic solution holding body 33 through the communicating pipe 15 and is impregnated into the electrolytic solution holding body 33. The electrolytic solution that is impregnated into the electrolytic solution holding body 33 is supplied to the electric storage device main body 2 from the electrolytic solution holding body 33 by capillary force that results from the microvoids of the positive electrode 7 and the negative electrode 8 if there is insufficient electrolytic solution inside the electric storage device main body 2 due to evaporation of the electrolytic solution, for example. The rest of the configuration is similar or identical to that of Embodiment 1.

In a pressure regulating apparatus 4 of this kind, because an electrolytic solution returning portion 31 that directs electrolytic solution into a vessel 3 from inside a regulating chamber 17 has: a communicating pipe 32 that is connected to a case 12; and a porous electrolytic solution holding body 33 that is connected to the communicating pipe 32 and that contacts an electric storage device main body 2, electrolytic solution that is directed from inside the regulating chamber 17 through the communicating pipe 32 can be held by the electrolytic solution holding body 33. The electrolytic solution holding body 33 can thereby be made to function as a pressure loss barrier, enabling the reverse flow of electrolytic solution from inside the vessel 3 into the regulating chamber 17 to be suppressed. Consequently, the electrolytic solution that is inside the vessel 3 can be more reliably prevented from leaking out of the vessel 3.

Because the average void diameter of the electrolytic solution holding body 33 is greater than the respective average void diameters of the positive electrode 7 and the negative electrode 8, when there is insufficient electrolytic solution inside the electric storage device main body 2, capillary force that results from the microvoids of the positive electrode 7 and the negative electrode 8 can be more reliably generated, enabling the electrolytic solution to be supplied from the electrolytic solution holding body 33 to the electric storage device main body 2 more reliably.

Moreover, in the above example, the electrolytic solution holding body 33 contacts the negative electrode 8 at a side surface of the electric storage device main body 2, but the electrolytic solution holding body 33 may also contact the positive electrode 7 at a side surface of the electric storage device main body 2, or the electrolytic solution holding body 33 may also contact at least one of the positive electrode 7, the negative electrode 8, and the separator 9 at an upper surface of the electric storage device main body 2.

In the above example, the average void diameter of the electrolytic solution holding body 33 is greater than the respective average void diameters of the positive electrode 7 and the negative electrode 8, but the average void diameter of the electrolytic solution holding body 33 may also be made similar or identical to the respective average void diameters of the positive electrode 7 and the negative electrode 8, or the average void diameter of the electrolytic solution holding body 33 may also be made smaller than the respective average void diameters of the positive electrode 7 and the negative electrode 8, provided that supplying of the electrolytic solution to the electric storage device main body 2 is possible from the electrolytic solution holding body 33 when there is insufficient electrolytic solution inside the electric storage device main body 2.

Embodiment 3

Figure 5:
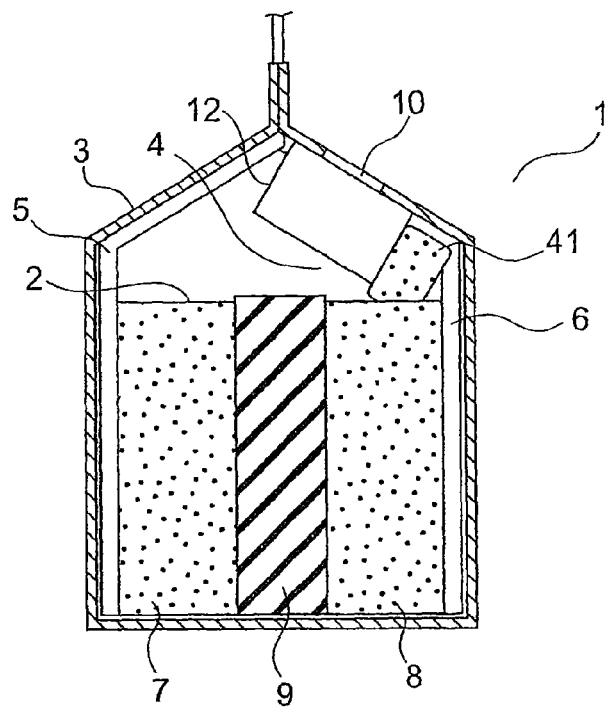
FIG. 5 is a cross section that shows an electric storage device according to Embodiment 3 of the present invention.

FIG. 5 is a cross section that shows an electric storage device according to Embodiment 3 of the present invention. In the figure, a porous electrolytic solution holding body (an electrolytic solution returning portion) 41 that directs electrolytic solution that enters a regulating chamber 17 into a vessel 3 is disposed between a case 12 and an electric storage device main body 2. A space inside the regulating chamber 17 and a space inside the vessel 3 communicate with each other by means of the electrolytic solution holding body 41. The electrolytic solution holding body 41 contacts the case 12 so as to seal a connecting port 23 (FIG. 2), and contacts a negative electrode 8 at an upper surface of the electric storage device main body 2. The configuration of the electrolytic solution holding body 41 is similar or identical to the configuration of the electrolytic solution holding body 33 according to Embodiment 3.

Electrolytic solution that enters the regulating chamber 17 is impregnated into the electrolytic solution holding body 41 from the connecting port 23. The electrolytic solution that is impregnated into the electrolytic solution holding body 41 is supplied to the electric storage device main body 2 by capillary force that results from the microvoids of the positive electrode 7 and the negative electrode 8 if there is insufficient electrolytic solution inside the electric storage device main body 2. The rest of the configuration is similar or identical to that of Embodiment 2.

In a pressure regulating apparatus 4 of this kind, because a porous electrolytic solution holding body 41 that directs electrolytic solution that is inside a regulating chamber 17 into a vessel 3 contacts both a case 12 and an electric storage device main body 2, the electrolytic solution holding body 41 functions as a pressure loss barrier, enabling the reverse flow of electrolytic solution from inside the vessel 3 into the regulating chamber 17 to be suppressed using a simple configuration.

In the above example, the electrolytic solution holding body 41 contacts the negative electrode 8 at an upper surface of the electric storage device main body 2, but the electrolytic solution holding body 41 may also contact the positive electrode 7 at a side surface of the electric storage device main body 2, or the electrolytic solution holding body 41 may also contact at least one of the positive electrode 7, the negative electrode 8, and the separator 9 at an upper surface of the electric storage device main body 2.

In the above example, the average void diameter of the electrolytic solution holding body 41 is greater than the respective average void diameters of the positive electrode 7 and the negative electrode 8, but the average void diameter of the electrolytic solution holding body 41 may also be made similar or identical to the respective average void diameters of the positive electrode 7 and the negative electrode 8, or the average void diameter of the electrolytic solution holding body 41 may also be made smaller than the respective average void diameters of the positive electrode 7 and the negative electrode 8, provided that supplying of the electrolytic solution to the electric storage device main body 2 is possible from the electrolytic solution holding body 41 when there is insufficient electrolytic solution inside the electric storage device main body 2.

Embodiment 4

Figure 6:
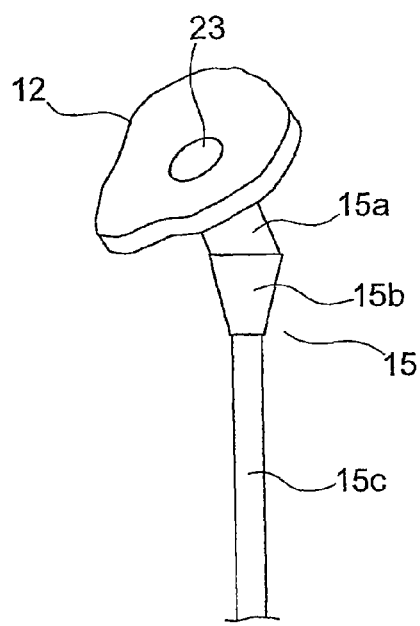
FIG. 6 is a partial perspective that shows a communicating pipe of a pressure regulating apparatus according to Embodiment 4 of the present invention.

FIG. 6 is a partial perspective that shows a communicating pipe 15 of a pressure regulating apparatus according to Embodiment 4 of the present invention. In the figure, a communicating pipe 15 that extends from a case 12 to an electric storage device main body 2 has: a large diameter pipe portion 15a that is connected to the case 12; a choke tube portion 15b that is connected to an end portion of the large diameter pipe portion 15a near the electric storage device main body 2; and a small diameter pipe portion 15c that is connected to an end portion of the choke tube portion 15b near the electric storage device main body 2. An inside diameter of the large diameter pipe portion 15a is identical to an inside diameter of a connecting port 23. An inside diameter of the small diameter pipe portion 15c is smaller than the inside diameter of the large diameter pipe portion 15a.

An inside diameter of the choke tube portion 15b is reduced continuously from an end near the large diameter pipe portion 15a (near a regulating chamber 17) toward the small diameter pipe portion 15c (toward the electric storage device main body 2). Consequently, the inside diameter of the end portion of the choke tube portion 15b near the large diameter pipe portion 15a (near the regulating chamber 17) is a maximum inside diameter of the choke tube portion 15b, and the inside diameter of the end portion of the choke tube portion 15b near the small diameter pipe portion 15c (near the electric storage device main body 2) is a minimum inside diameter of the choke tube portion 15b. The maximum inside diameter of the choke tube portion 15b is identical to the inside diameter of the large diameter pipe portion 15a. The minimum inside diameter of the choke tube portion 15b is identical to the inside diameter of the small diameter pipe portion 15c. A length of the choke tube portion 15b is shorter than a length of the small diameter pipe portion 15c. The rest of the configuration is similar or identical to that of Embodiment 1.

In a pressure regulating apparatus 4 of this kind, because a small diameter pipe portion 15c that has an inside diameter that is identical to a minimum inside diameter of a choke tube portion 15b that has an inside diameter that is reduced continuously from an end near a regulating chamber 17 toward an end near an electric storage device main body 2 is connected to an end portion of the choke tube portion 15b near the electric storage device main body 2, and a length of the choke tube portion 15b is shorter than a length of the small diameter pipe portion 15c, electrolytic solution that is inside the regulating chamber 17 can be easily led through the communicating pipe 15 to the electric storage device main body 2, and the electrolytic solution can also be made less likely to flow back through the communicating pipe 15 from inside the vessel 3 into the regulating chamber 17.

Moreover, in the above example, the inside diameter of the small diameter pipe portion 15c is identical to the minimum inside diameter of the choke tube portion 15b, but the inside diameter of the small diameter pipe portion 15c may also be made smaller than the minimum inside diameter of the choke tube portion 15b. Reverse flow of the electrolytic solution from inside the vessel 3 into the regulating chamber 17 can thereby be further suppressed.

In the above example, the communicating pipe 15 has a large diameter pipe portion 15a, but the large diameter pipe portion 15a may also be eliminated, and the choke tube portion 15b connected directly to the case 12.

In the above example, a configuration of a communicating pipe 15 that has a choke tube portion 15b and a small diameter pipe portion 15c is applied to the configuration of the communicating pipe 15 according to Embodiment 1, but the configuration of a communicating pipe 15 that has a choke tube portion 15b and a small diameter pipe portion 15c may also be applied to the configuration of the communicating pipe 32 according to Embodiment 2.

Embodiment 5

Figure 7:
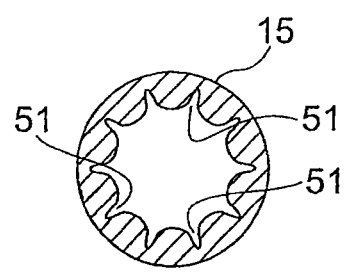
FIG. 7 is a cross section that shows a communicating pipe of a pressure regulating apparatus according to Embodiment 5 of the present invention.

FIG. 7 is a cross section that shows a communicating pipe 15 of a pressure regulating apparatus according to Embodiment 5 of the present invention. In the figure, a plurality of grooves 51 that are parallel to a longitudinal direction of a communicating pipe 15 are disposed on an inner surface of the communicating pipe 15. In this example, the grooves 51 are disposed at a uniform pitch around an inner circumference of the communicating pipe 15. A width dimension of the grooves 51 becomes successively narrower outward in a radial direction of the communicating pipe 15 from an inner surface of the communicating pipe 15 (i.e., toward bottom portions of the grooves 51). The rest of the configuration is similar or identical to that of Embodiment 1.

In a pressure regulating apparatus 4 of this kind, because grooves 51 that are parallel to a longitudinal direction of a communicating pipe 15 are disposed on an inner surface of the communicating pipe 15, the electrolytic solution can be more reliably directed through the communicating pipe 15 from inside the regulating chamber 17 into the vessel 3 by the generation of capillary action in the grooves 51.

Because the width dimension of the grooves 51 becomes successively narrower outward in a radial direction of the communicating pipe 15 from the inner surface of the communicating pipe 15, the generation of capillary action in the grooves 51 can be further facilitated.

In the above example, a plurality of grooves 51 are disposed on an inner surface of a communicating pipe 15 according to Embodiment 1, but a plurality of grooves 51 may also be disposed on an inner surface of the communicating pipe 32 according to Embodiment 2, or on an inner surface of the communicating pipe 15 according to Embodiment 4.

In each of the above embodiments, an internal portion of a case 12 is partitioned into a regulating chamber 17 and a check valve chamber 18 by a partitioning plate 16, and a check valve 14 is disposed inside the check valve chamber 18, but the partitioning plate 16 may also be removed from inside the case 12, the check valve 14 mounted onto an outer surface of the vessel 3, and an gas vent 10 opened and closed by a valve main body 20. In that case, all of the space inside the case 12 constitutes a regulating chamber. In this manner, the regulating chamber can also be ensured inside the case 12, and electrolytic solution that penetrates the semipermeable membrane 13 can be prevented from reaching the check valve. Electrolytic solution that enters the regulating chamber can also be returned to the vessel 3.

EXPLANATION OF NUMBERING

1 ELECTRIC STORAGE DEVICE; 2 ELECTRIC STORAGE DEVICE MAIN BODY; 3 VESSEL; 4 PRESSURE REGULATING APPARATUS; 7 POSITIVE ELECTRODE; 8 NEGATIVE ELECTRODE; 10 GAS VENT; 11 OPENING PORTION; 12 CASE; 13 SEMIPERMEABLE MEMBRANE; 14 CHECK VALVE; 15 COMMUNICATING PIPE (ELECTROLYTIC SOLUTION RETURNING PORTION); 15B CHOKE TUBE PORTION; 15C SMALL DIAMETER PIPE PORTION; 17 REGULATING CHAMBER; 31 ELECTROLYTIC SOLUTION RETURNING PORTION; 32 COMMUNICATING PIPE; 33 ELECTROLYTIC SOLUTION HOLDING BODY; 41 ELECTROLYTIC SOLUTION HOLDING BODY; 15 GROOVE.

The invention claimed is:
1. An electric storage device pressure regulating apparatus that is disposed on an electric storage device that comprises:
an electric storage device main body that is impregnated with an electrolytic solution; and
a vessel that hermetically seals the electric storage device main body,
the electric storage device pressure regulating apparatus regulating internal pressure of the vessel,
the electric storage device pressure regulating apparatus comprising:
a case that is disposed inside the vessel so as to cover a gas vent that is disposed on the vessel, and on which a regulating chamber is disposed internally on which an opening portion is disposed, the regulating chamber communicating with a space inside the vessel by the opening portion;

a porous semipermeable membrane that seals the opening portion, and through which a gas that is inside the vessel can permeate;

a check valve that stops discharging of the gas out of the vessel from inside the regulating chamber when internal pressure of the regulating chamber is less than or equal to a predetermined value, and that discharges gas out of the vessel from inside the regulating chamber through the gas vent when the internal pressure of the regulating chamber exceeds the predetermined value; and an electrolytic solution returning portion that communicates between a space inside the regulating chamber and a space inside the vessel, that comprises a porous electrolytic solution holding body that contacts the case and the electric storage device main body, that extends from the case to the electric storage device main body, and that directs electrolytic solution that enters the regulating chamber to the electric storage device main body.

2. An electric storage device pressure regulating apparatus according to claim 1, wherein:

the electric storage device main body comprises a porous electrode; and an average void diameter of the electrolytic solution holding body is greater than an average void diameter of the electrode.

3. An electric storage device pressure regulating apparatus according to claim 2, wherein a volume of the regulating chamber is a volume that can accommodate an amount of excess electrolytic solution that is obtained by subtracting an amount of electrolytic solution that can be impregnated into the electric storage device main body from a total amount of electrolytic solution that is inside the vessel.

4. An electric storage device pressure regulating apparatus according to claim 1, wherein a volume of the regulating chamber is a volume that can accommodate an amount of excess electrolytic solution that is obtained by subtracting an amount of electrolytic solution that can be impregnated into the electric storage device main body from a total amount of electrolytic solution that is inside the vessel.

5. An electric storage device pressure regulating apparatus according to claim 1, wherein:

the electrolytic solution returning portion further comprises a communicating pipe that is connected to the case; and the electrolytic solution holding body is connected to the case by the communicating pipe.

6. An electric storage device pressure regulating apparatus according to claim 5, wherein:

the communicating pipe comprises:

a choke tube portion that has an inside diameter that is reduced continuously from an end near the regulating chamber toward the electric storage device main body; and a small diameter pipe portion that is connected to an end portion of the choke tube portion near the electric storage device main body, and that has an inside diameter that is less than or equal to a minimum inside diameter of the choke tube portion; and a length of the choke tube portion is shorter than a length of the small diameter pipe portion.

7. An electric storage device pressure regulating apparatus according to claim 6, wherein a groove that is parallel to a longitudinal direction of the communicating pipe is disposed on an inner surface of the communicating pipe.

8. An electric storage device pressure regulating apparatus according to claim 5, wherein a groove that is parallel to a longitudinal direction of the communicating pipe is disposed on an inner surface of the communicating pipe.

9. An electric storage device comprising an electric storage device pressure regulating apparatus according to claim 1.

* * * * *